Dec. 4, 1934.  E. C. LEACH ET AL  1,982,817

TRUCK MIXER

Filed Sept. 5, 1930  8 Sheets-Sheet 1

Inventors:
Elbert C. Leach,
Eric O. Hamren,

Dec. 4, 1934.  E. C. LEACH ET AL  1,982,817

TRUCK MIXER

Filed Sept. 5, 1930   8 Sheets-Sheet 4

Inventors:
Elbert C. Leach,
Eric O. Hamren,

Dec. 4, 1934.  E. C. LEACH ET AL  1,982,817
TRUCK MIXER
Filed Sept. 5, 1930   8 Sheets-Sheet 7

Inventors:
Elbert C. Leach,
Eric O. Hamren,

Patented Dec. 4, 1934

1,982,817

UNITED STATES PATENT OFFICE 1,982,817

TRUCK MIXER

Elbert C. Leach and Eric O. Hamren, Oshkosh, Wis., assignors to Leach Company, Oshkosh, Wis., a corporation of Wisconsin Application September 5, 1930, Serial No. 479,854

4 Claims. (Cl. 83—73)

This invention has to do with mixers of the type used in preparing concrete, asphalt and other materials, and is particularly concerned with certain hereinafter described improvements in a truck-mounted mixer.

One object of the invention is to provide novel means for effecting a rapid and thorough discharge of the material from the mixing receptacle when the discharge gate is opened, which means, in a preferred embodiment of the invention, will function automatically as soon as the discharge gate is opened.

Another object is to provide mixing paddles of improved construction which will wipe the surface of the receptacle clean, will not bind on stones or other hard objects present in the material, will outwear all other known kinds of paddles, can be manufactured inexpensively, and can be replaced without difficulty.

Another object is to provide special end mixing paddles which will operate efficiently in contact with the ends of the receptacle.

Another object is to provide novel means which coact with the end paddles to prevent wear on the ends of the receptacle.

Another object is to provide an improved water-tight discharge gate and control mechanism for the same.

Another object is to provide a novelly combined discharge gate and cut-off gate.

Another object is to provide a mixing receptacle of novel construction and arrangement with respect to the discharge gate in the same.

Another object is to provide improved means for sealing the bearings of the shafts on which the paddles are mounted.

Another object is to provide means for preventing an initial overload on the mixer.

Another object is to provide a novelly constructed and operated power-transmitting mechanism which permits reversal of one of the paddle shafts driven thereby.

Still other objects and advantages of the invention will be apparent to those skilled in the art upon a full understanding of the construction, arrangement and operation of the improved mixer.

One embodiment of the invention is presented herein for the purpose of exemplification, but it will of course be appreciated that the invention is susceptible of incorporation in other structurally modified forms coming equally within the scope of the appended claims.

Figure 7:
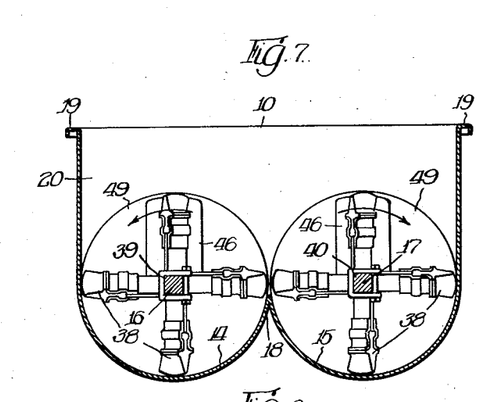
Fig. 7 is a vertical transverse section through the mixing receptacle, taken on the line 7—7 of Fig. 2.
Figure 8:
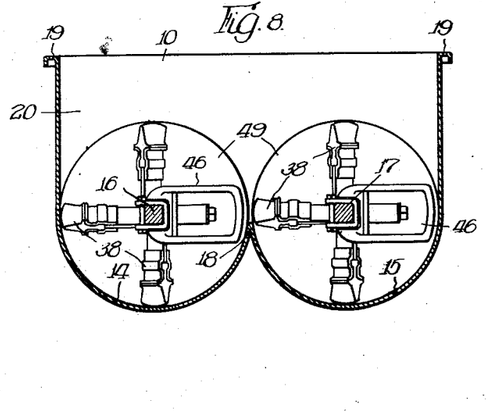
Fig. 8 is a similar section, taken on the line 8—8 of Fig. 2.

In the embodiment of the invention illustrated in the drawings, an open-topped mixing receptacle 10 is mounted on the chassis 11 of a motor truck 12 behind the driver's cab 13. The receptacle is generally rectangular in shape and is composed of two parallel trough portions 14 and 15 (see Fig. 7) which are curved on arcs about two longitudinally extending axes 16 and 17. The inner sides of the trough portions 14 and 15 are of considerably less height than the outer sides and come together in a low center rib 18. The outer sides of the trough portions extend vertically above the level of the axes 16 and 17 and terminate in rims 19 at the sides of the receptacle. The front and rear ends 20 and 21 of the receptacle extend vertically upward from the bottoms of the trough portions and terminate even with the rims 19 at the sides of the receptacle.

Figure 5:
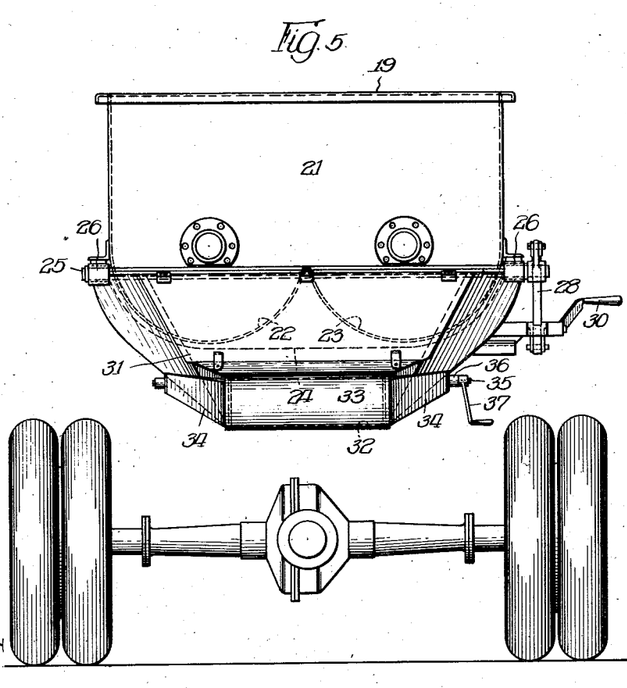
Fig. 5 is a rear end view of the truck mixer.
Figure 6:
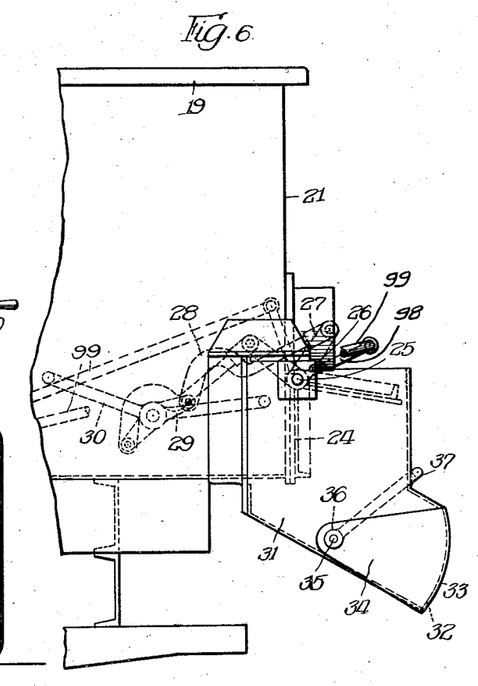
Fig. 6 is a fragmentary side view of the mixing receptacle, showing the discharge gate and the cut-off gate.

In the rear end 21 of the receptacle, two segment-shaped discharge openings 22 and 23 are provided. The lower edges of the openings are curved and register with the rear ends of the trough portions 14 and 15, while the upper edges of the openings are horizontal and are located a short distance below the level of the axes 16 and 17. The discharge openings 22 and 23 are normally closed by a wide gate 24 (see Figs. 5 and 6) which is attached along its upper edge to a horizontal shaft 25. The shaft 25 is journaled in bearings 26 on the rear end of the receptacle and is provided at one end with a short arm 27 which is connected by a curved link 28 to another short arm 29 on a hand crank 30. The arms 27 and 29 and the link 28 together form a toggle arrangement which permits the gate to be swung open or closed by the hand crank 30 and locked in either of such positions by a past-dead-center positioning of the link 28 with respect to the arm 29. The gate 24 is enclosed within the upper portion of a downwardly and rearwardly sloping discharge chute 31 which has a rearwardly facing rectangular outlet 32. The outlet 32 has curved side edges and is normally closed by a correspondingly curved cut-off gate 33. The gate 33 is provided at its ends with forwardly extending portions 34 which are attached to a rod 35. The rod 35 is journaled in bearing apertures 36 in the sides of the chute 31 and is provided at one end with a hand crank 37. The gate 35 is adapted to be swung into either its open or closed position by means of the hand crank 37.

Figures 4, 11, 12, 13:
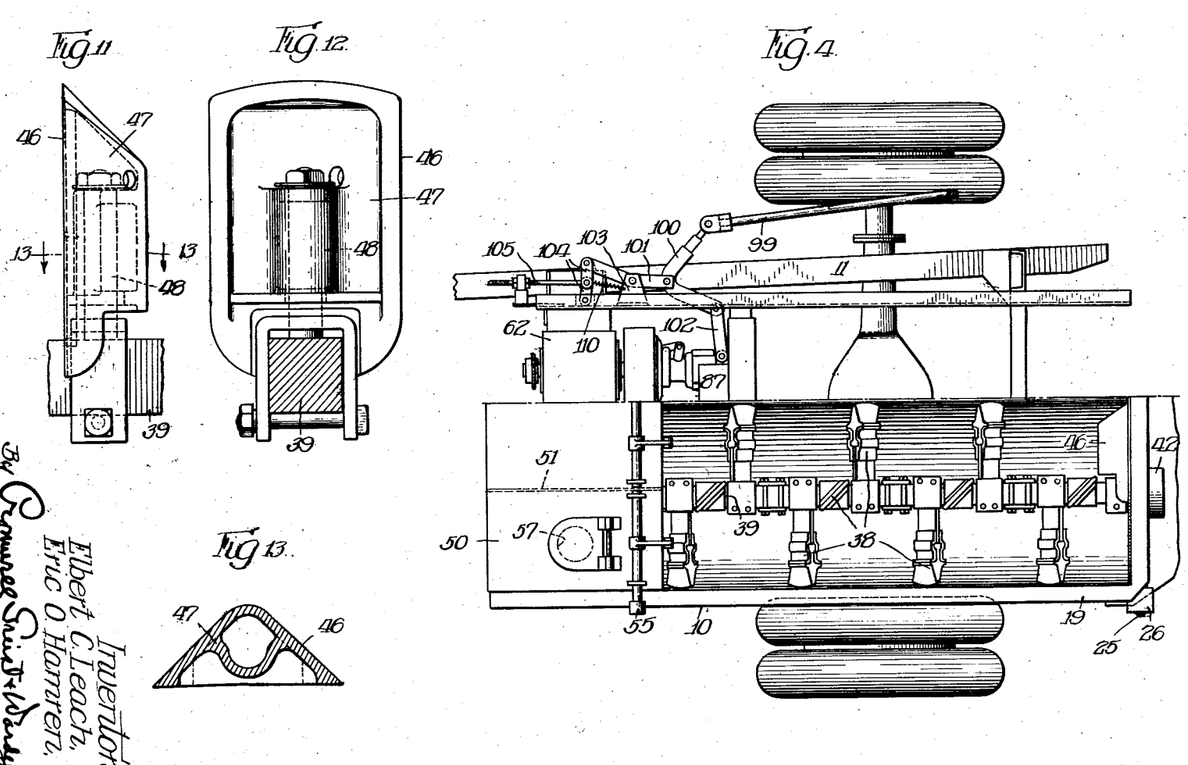
Fig. 4 is a composite horizontal section, taken on the irregular line 4—4 of Fig. 3, showing the control mechanism for the discharge gate.
Fig. 11 is an edge view of one of the end paddles.
Fig. 12 is a face view of one of such paddles.
Fig. 13 is a transverse section, taken on the line 13—13 of Fig. 11.
Figure 9:
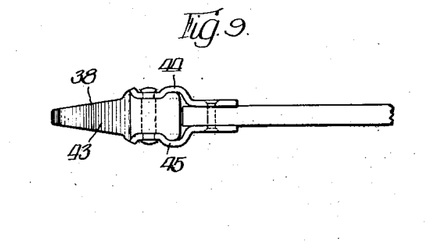
Fig. 9 is an edge view of one of the rubber tipped mixing paddles.
Figure 10:
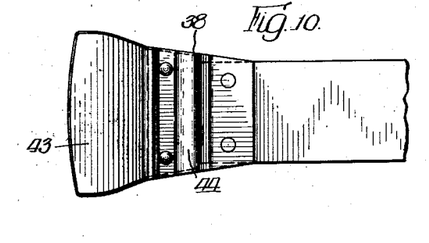
Fig. 10 is a face view of one of such paddles.

The material which is placed in the receptacle 10 is thoroughly mixed by a number of paddles 38 which are attached to two shafts 39 and 40 in the receptacle. The shafts 39 and 40 are journaled in the ends of the receptacle in front bearings 41 (see Fig. 14) and rear bearings 42 (see Fig. 15) which are located on the previously mentioned axes of curvature 17 and 18 of the trough portions 14 and 15. The paddles 38 extend radially from the shafts and are provided at their outer ends with relatively wide rubber blades 43 (see Figs 9 and 10) which are set angularly in such a way as to together form in effect interrupted helixes throughout the greater portions of the lengths of the shafts. The inner ends of the rubber blades 43 are detachably clamped between two flared jaws 44 and 45 on the ends of the paddle arms, and the outer portions of the blades taper outwardly and are curved slightly at their extremities to conform closely to the curved surfaces of the receptacle. The paddles 46 at the extreme ends of the shafts 39 and 40 preferably differ from the paddles 38. They consist of metal blades 47 of triangular cross section (see Figs. 11, 12 and 13) which are pivoted on arms 48 and adjust themselves snugly against wear plates 49 which are removably positioned against the front and rear end walls 22 and 23 of the receptacle.

Figure 1:
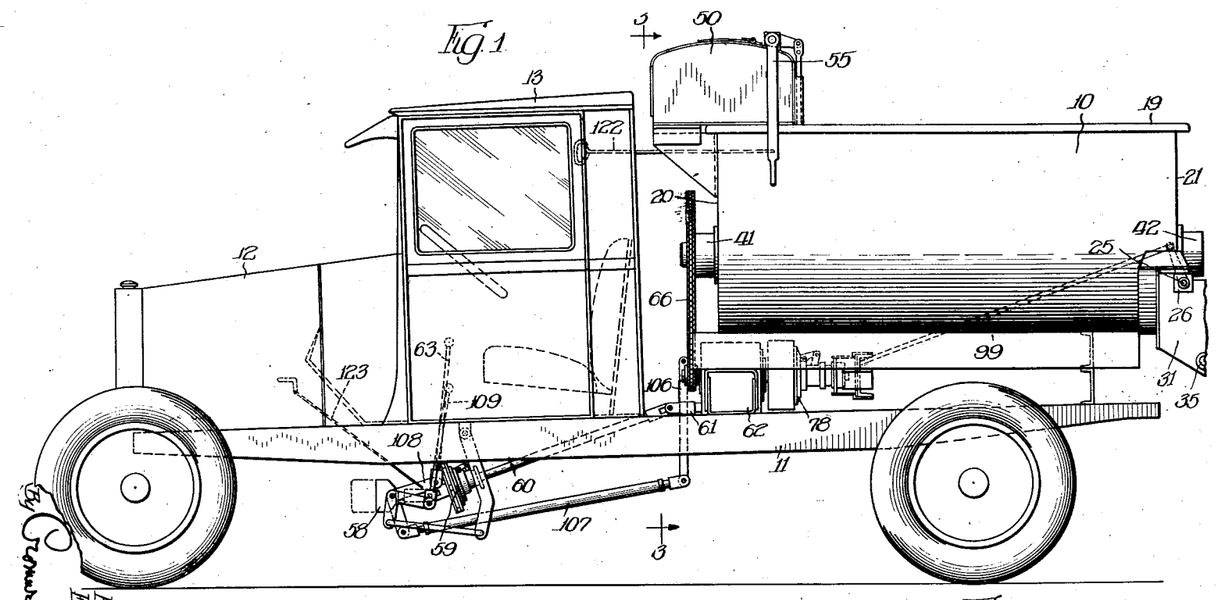
Fig. 1 is a side view of a truck mixer constructed in accordance with the invention.
Figure 2:
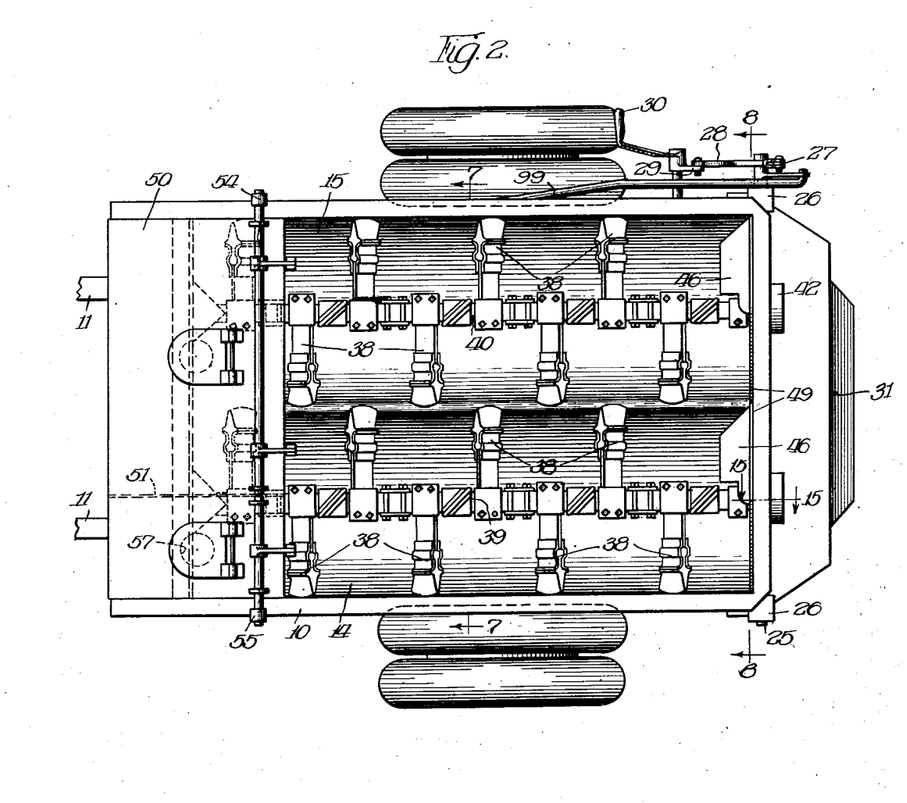
Fig. 2 is a plan view of the mixing receptacle.

The water or other liquid which is to be added to and mixed with the material in the receptacle is carried in a tank 50 (see Fig. 1) which is mounted on top of the front end of the receptacle 10. The tank 50 is divided by a partition 51 (see Fig. 3) into two compartments 52 and 53. The compartment 52 is adapted to hold a measured quantity of water which is just sufficient to mix with the material in the receptacle in proper proportion, while the compartment 53 is adapted to contain an additional supply of water to be used in flushing out the receptacle after the mixed material has been discharged therefrom. A hand lever 54 is employed to operate a valve (not shown) which controls the discharge of the water from the compartment 52, and another hand lever 55 is employed to control the valve (not shown) which controls the discharge of the water from the compartment 53. The compartments 52 and 53 are adapted to be filled through normally closed openings 56 and 57 in the tops thereof.

Figure 3:
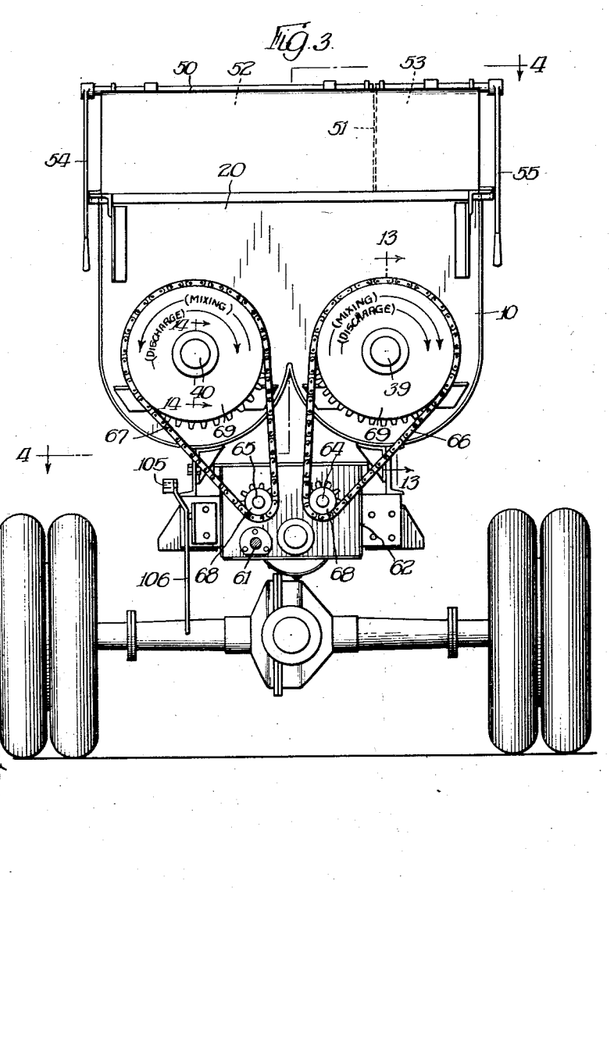
Fig. 3 is a vertical transverse section, taken on the line 3—3 of Fig. 1, showing the front end of the mixing receptacle and the arrangement of the power-transmitting mechanism with respect thereto.

During the mixing operation, the paddle shafts 39 and 40 are caused to rotate in the opposite direction indicated by the curved arrows labeled "Mixing" in Fig. 3. Such rotation of the paddle shafts causes the material being mixed to move toward the rear end of the receptacle in the trough portion 14 and to move toward the front end in the trough portion 15. As the material in the trough portion 15 reaches the front end of the receptacle it is carried over the front end of the rib 18 into the trough portion 14, and, as the rearwardly traveling material in the trough portion 14 reaches the rear end of the receptacle, it is carried over the rear end of the rib 18 into the trough portion 15, resulting in a continuous rectilinear circulation of the material within the receptacle during the mixing operation.

Figure 16:
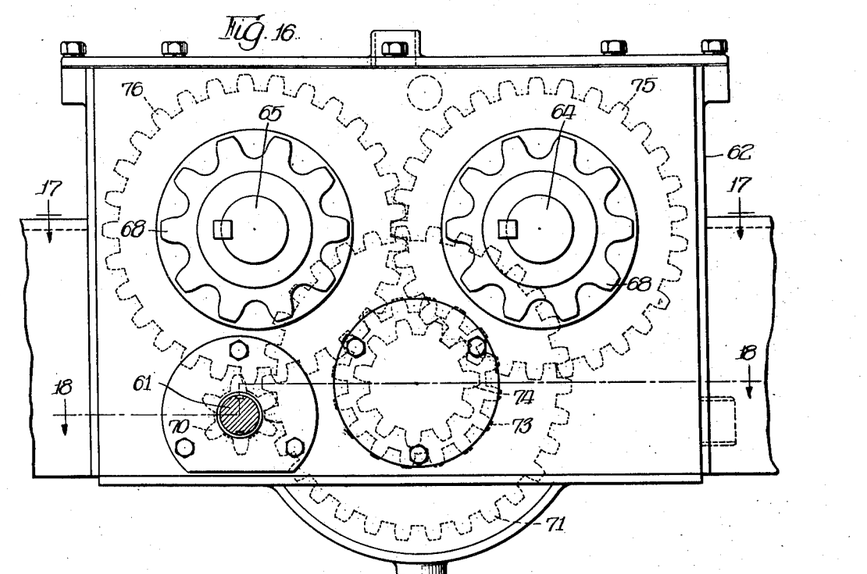
Fig. 16 is a front view of the casing which houses the shaft-driving transmission.
Figure 17:
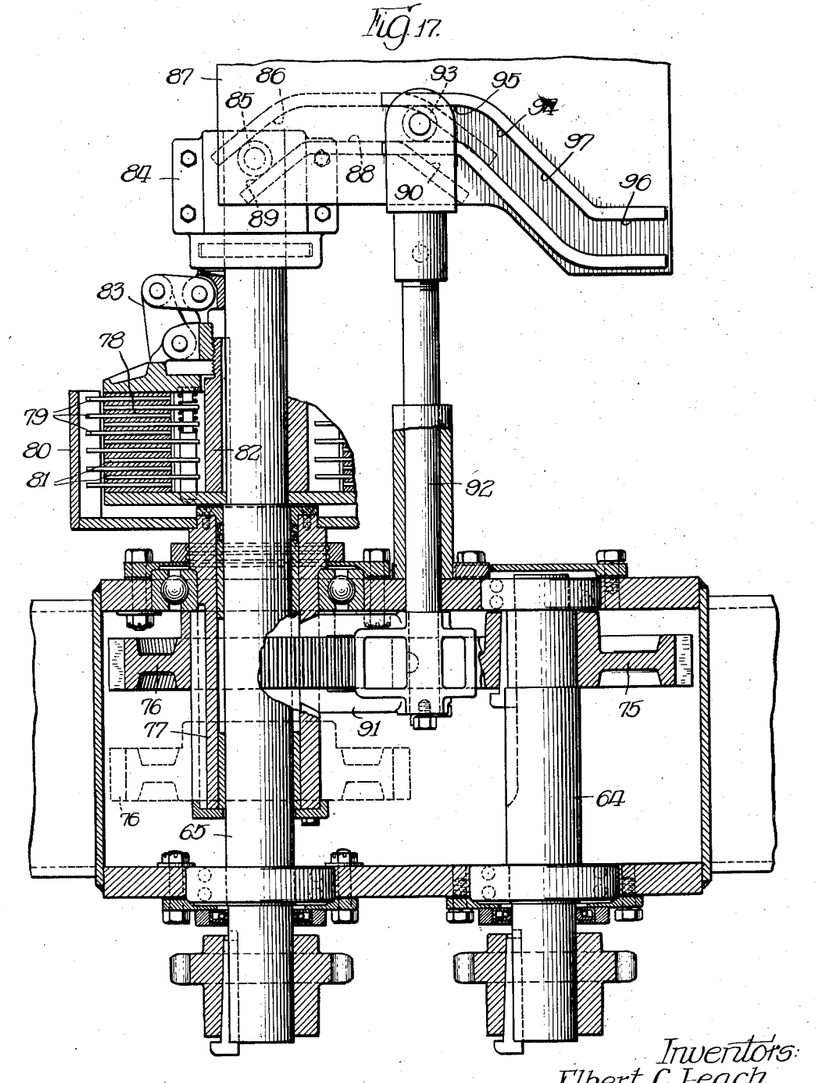
Fig. 17 is a horizontal section through the transmission, taken on the line 17—17 of Fig. 16.
Figure 18:
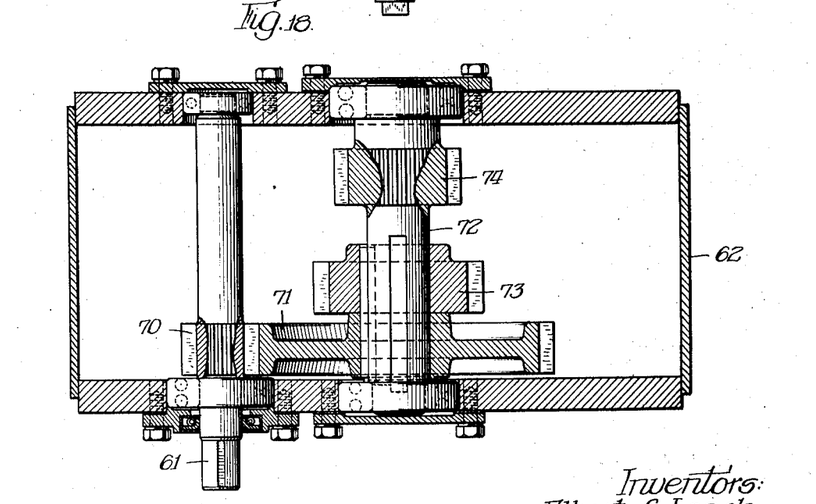
Fig. 18 is another horizontal section through the transmission, taken on the irregular line 18—18 of Fig. 16.

The power used in rotating the shafts 39 and 40 is derived from the motor (not shown) of the truck and is obtained through a power-take-off device 58 mounted on the transmission of the motor. From the device 58, the power is delivered through a clutch 59 to a shaft 60 which is coupled with a shaft 61 in a transmission casing 62 below the front end of the receptacle 10. The clutch 59 may be thrown into or out of operation by manipulation of a lever 63 located in the driver's cab. In the transmission casing 62, the power from the shaft 61 is transmitted to two oppositely rotating shafts 64 and 65 (see Figs. 3, 16 and 17). The shafts 64 and 65 are connected respectively to the paddle shafts 39 and 40 by chains 66 and 67 which are trained about small sprockets 68 on the shafts 64 and 65 and large sprockets 69 on the shafts 39 and 40. The connections between the shaft 61 and the shafts 64 and 65 within the casing 62 consist of a pinion 70 on the shaft 61 which meshes laterally with a gear 71 on a centrally arranged shaft 72. A pinion 73 is secured to the shaft 72 behind the gear 71, and another pinion 74 of slightly smaller diameter than the pinion 73 is also secured to the shaft 72 behind the pinion 73. The small pinion 74 meshes with a gear 75 which is secured to the previously mentioned shaft 64, and the gear 75 in turn meshes with a gear 76 which is shiftably splined on a sleeve 77 on the previously mentioned shaft 65. The sleeve 77 is normally connected to the shaft 65 by a disk clutch 78. Certain of the disks 79 of the clutch 78 are non-rotatably coupled with the sleeve 77 by an encompassing drum 80 which is attached to the sleeve, and the remaining interleaved disks 81 of the clutch are non-rotatably associated with a tube 82 which is keyed to the shaft 65.

The two sets of clutch disks 79 and 81 are adapted to be forced into frictional engagement with each other by a leverage arrangement 83 of well known construction upon forward movement of a control collar 84. The collar 84 is slidably mounted on the rear end of the shaft 65 and is provided with a roller 85 which fits within a guideway 86 on the bottom of a laterally shiftable control plate 87. The guideway 86 has a transversely extending central portion 88 and two oblique end portions 89 and 90. When the roller 85 is in the oblique portion 89 of the guideway, the clutch 78 is engaged and the shaft 65 is non-rotatably coupled through the clutch with the gear 76. When the control plate 87, which is prevented from shifting longitudinally of the shaft 65, is shifted laterally, the camming engagement of the guideway 86 with the roller 85 will shift the clutch-controlling collar 84 rearwardly. When the roller 85 enters the transversely extending portion 88 of the guideway in the laterally traveling plate, the clutch 78 assumes a fully released position, in which position the gear 76 is disengaged from the shaft 65. As the control plate 87 continues its lateral movement in the same direction, the oblique portion 90 of the guideway moves into a position above the shaft 65 and cams the roller 85 forwardly, causing the collar 84 to shift the clutch 78 back again into its coupled position. From the foregoing, it will be understood that lateral movement of the plate 87 to the left (see Fig. 17) will serve to momentarily disengage the clutch 78. During the moment in which the clutch is disengaged, the gear 76 is automatically shifted forwardly on the sleeve 77 out of mesh with the gear 75 and into mesh with the pinion 73 on the shaft 72. By thus changing the position of the gear 76, the direction of rotation of the shaft 65 will be reversed. When the gear 76 is in mesh with the gear 75, the paddle shafts 39 and 40 will rotate in opposite directions. When the gear 76 is in mesh with the pinion 73, however, the paddle shaft 40 will reverse its direction of rotation and will rotate in the same direction as the paddle shaft 39. Such a reversal, which obviously causes the material in both the trough portion 14 and the trough portion 15 to travel rearwardly toward the discharge openings 22 and 23, is caused to automatically take place as soon as the discharge gate 24 is opened by turning the crank 30. The gear 76 is moved axially on the sleeve 77 by means of a shifting fork 91 which embraces the sides of the gear and is attached to the front end of a shiftable rod 92. The rear end of the rod 92 carries a roller 93 which is positioned in a guideway 94 on the upper surface of the control plate 87. The guideway 94 has a transversely extending portion 95, another forwardly offset transversely extending portion 96 and an oblique connecting portion 97. The relative arrangement of the guideways 86 and 94 in the control plate 87 is such as to cause the clutch 78 to become disengaged just prior to and during the shifting of the gear 76 from the full line position shown in Fig. 17 to the dotted line position shown in that view, and vice versa.

As previously stated, the reversal of the paddle shaft 40 takes place automatically upon the opening of the discharge gate 24, as a result of which the mixed material in the receptacle 10 is discharged rapidly through the openings 22 and 23 and the inside surfaces of the receptacle are wiped clean by the rubber ends on the paddles 38. To obtain this automatic coaction, the shaft 25, which is rotated manually by the hand crank 30 when the discharge gate is being opened, is provided at one end with an arm 98 which is pivoted at its outer end to a long forwardly extending rod 99. The front end of the rod 99 is pivoted to a bell-crank lever 100 which is pivotally mounted on the rear end of a forwardly extending bar 101, and the other end of the bell-crank lever is connected by a link 102 to the laterally shiftable control plate 87. The bar 101 is pivoted intermediate its ends to stationary bracket 103 and is normally prevented from moving by a pair of straightened toggle links 104 which are attached to the front end of the bar. When the shaft 25 rotates a sufficient distance to open the discharge gate 24, the rod 99 rocks the bell-crank lever 100 far enough to cause the link 102 to shift the control plate 87 into and through the released position of the clutch 78 into the reverse-drive position of the gear 76, thereby causing the paddle shaft 40 to reverse its direction of rotation. When the shaft 25 is thereafter rotated in the opposite direction to close the discharge gate, the linkage shifts the plate 87 back again into the position shown in Fig. 16.

In order to prevent overloading of the motor at the time that the mixing operation is started, means are provided for disconnecting the paddle shaft 40, whereby to start the mixing operation with only the paddle shaft 39. Such means consists of a rod 105 (see Fig. 4) which is pivoted at its rear end to the floating joint between the toggle links 104. The front end of the rod 105 is pivotally connected to the upper end of a downwardly extending lever 106 (see Fig. 1), and the lower end of the lever 106 is pivotally connected to a forwardly extending rod 107, which rod is attached at its front end to a bell-crank lever 108 which is rocked by manipulation of a hand lever 109 in the driver's cab. When the lever 109 is shifted by the driver into a position wherein the toggle links 104 are folded against the resistance of a straightening spring 110, the bar 101 rocks into a position wherein the control plate 87 shifts laterally a slight distance, far enough to disengage the clutch 78 which controls the operation of the shaft 40 but not so far as to move the gear 76 out of mesh with the gear 75.

Figure 14:
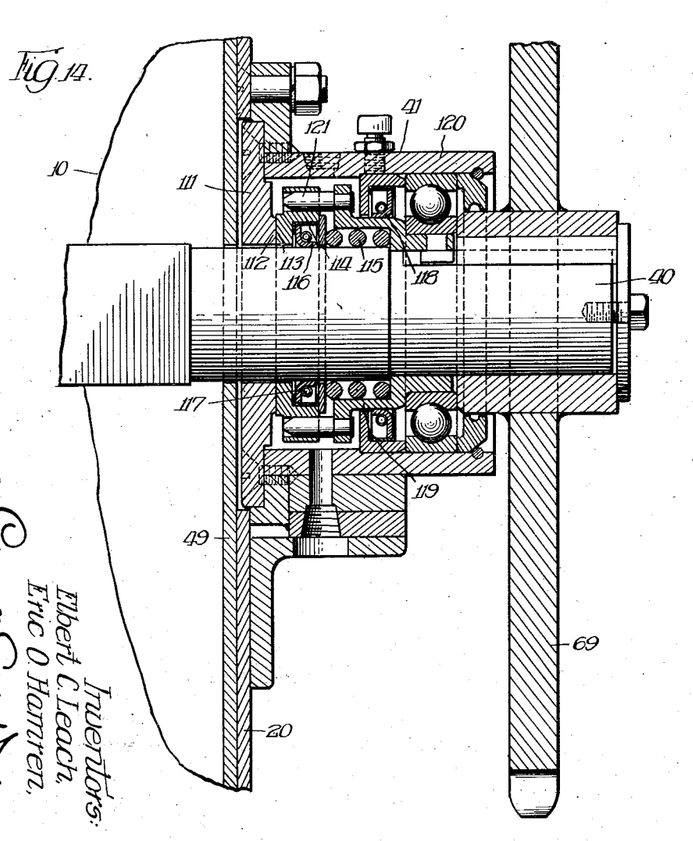
Fig. 14 is a vertical section through the front bearing for one of the paddle shafts, taken on the line 14—14 of Fig. 3.
Figure 15:
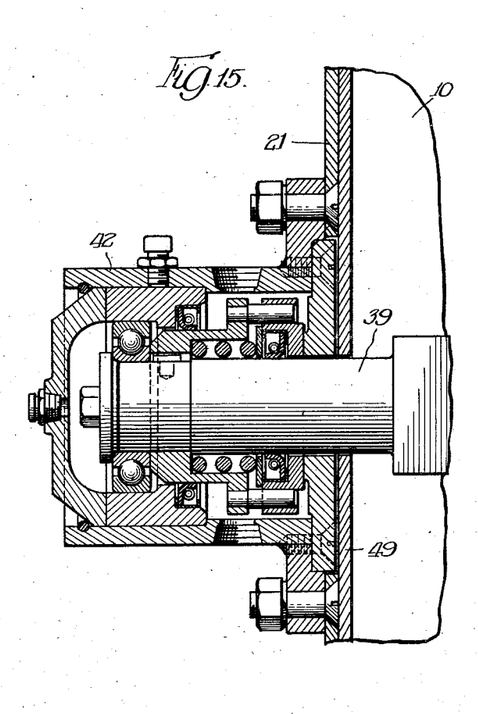
Fig. 15 is a vertical section through the rear end bearing for one of the paddle shafts, taken on the line 15—15 of Fig. 2.

The front and rear bearings 41 and 42 for the paddle shafts 39 and 40 are of such construction as to prevent the material in the receptacle from working into the same. As shown in Fig. 14, each of the front bearings consists of a centrally apertured plate 111 which is attached to the front end 22 of the receptacle. The plate 111 is provided with a flat ground surface 112 which engages with a similar surface 113 on a ring 114 which rotates with the shaft. The ring 114 is pressed against the plate 111 by a compressed spring 115, and the inner surface of the ring 114 is sealed against the shaft by a flange leather packing 116 which fits within a groove in the ring and is constricted on the shaft by a tensioned coil spring 117. A similar supplementary sealing device 118 is positioned between a member 119 which is keyed to the shaft and an encompassing housing 120 which is attached to the end of the receptacle about the plate 111. The member 119 drives the ring 114 through an extensible pin connection 121. As will be observed in Fig. 15, each of the rear end bearings 42 are constructed and operate in substantially the same manner as the front bearings.

The mixer of the invention is intended to be used in the same manner as other truck mixers. If used in the preparation, for instance, of concrete, the requisite amounts of cement, sand and gravel are dumped in the receptacle 10 at the loading bunkers or at some other suitable point of supply and the requisite amount of water is run into the compartment 52 of the tank 50, the compartment 53 also being filled at the same time with water for use in flushing out the receptacle after the mixture has been completed and discharged from the same. The truck is then driven to the place where the concrete is to be used. Either just before arrival at that place, or after arrival, if desired, the clutch 59 is engaged, causing the paddle shafts 39 and 40 to commence the actual mixing operation. At about the same time, the measured quantity of water in the tank 52 is discharged into the receptacle. If the receptacle is loaded to capacity, or if the power of the motor is insufficient to start both paddle shafts rotating at once without causing an overload, the paddle shaft 40 may be maintained as long as desired out of operation by releasing the clutch 78. As soon as the mixing operation is well under way in the trough portion acted upon by the rotating paddle shaft 39, the clutch 78 may be engaged without overloading the motor. The lever 54, which controls the discharge of the water from the tank section 52 into the mixing receptacle, may be conveniently manipulated from the driver's cab by means of an extension handle 122. In order to have the paddle shafts 39 and 40 rotate at a substantially constant speed during the mixing operation, the clutch 59 which connects the shafts up with the motor of the truck may be provided with a connection 123 leading to the throttle of the motor. When the clutch 59 is shifted into its engaging position, the throttle may obviously be turned into a predetermined position wherein the motor will deliver the requisite power at the desired speed.

We claim:

1. In a truck mixer, a mixing receptacle having a normally closed discharge outlet adjacent one end thereof, means for causing the material being mixed to move toward the outlet along one side of the receptacle and away from the outlet along the other side of the receptacle, means for causing the material to move toward the outlet along both sides of the receptacle when the outlet is opened, and means for automatically actuating said last mentioned means when the outlet is opened.

2. In a truck mixer, two parallel trough portions having discharge openings in corresponding ends thereof, a discharge gate normally closing the openings in the trough portions, two parallel paddle shafts journaled in the mixer in concentric relation to the trough portions, means for rotating the shafts in opposite directions to cause the material being mixed to move in one of the trough portions toward the opening in that portion and to move in the other trough portion away from the opening in that portion, means for reversing one of the shafts to cause the material to move toward the discharge openings in both trough portions, and means for opening the gate.

3. In a truck mixer, a mixing receptacle having an open semi-cylindrical trough portion, a shaft journaled in the receptacle in concentric relation to the trough portion, a plurality of paddles attached to the shaft, and means for rotating the shaft, the paddles at the ends of the shaft being provided with pivotally mounted metallic end portions of triangular cross-section which are adapted to engage flatly against the ends of the receptacle.

4. In a truck mixer, a mixing receptacle having an open semi-cylindrical trough portion, a shaft journaled in the receptacle in concentric relation to the trough portion, a plurality of paddles attached to the shaft, and means for rotating the shaft, the paddles at the ends of the shaft being provided with pivotally mounted metallic end portions of triangular cross-section which are adapted to engage flatly against the ends of the receptacle, and the ends of the receptacle being lined with replaceable wear plates for engagement with the triangular shaped paddles.

E. C. LEACH.
ERIC O. HAMREN.